Jan. 21, 1958 W. J. LA FOND 2,820,637
ARROWHEAD
Filed May 14, 1956
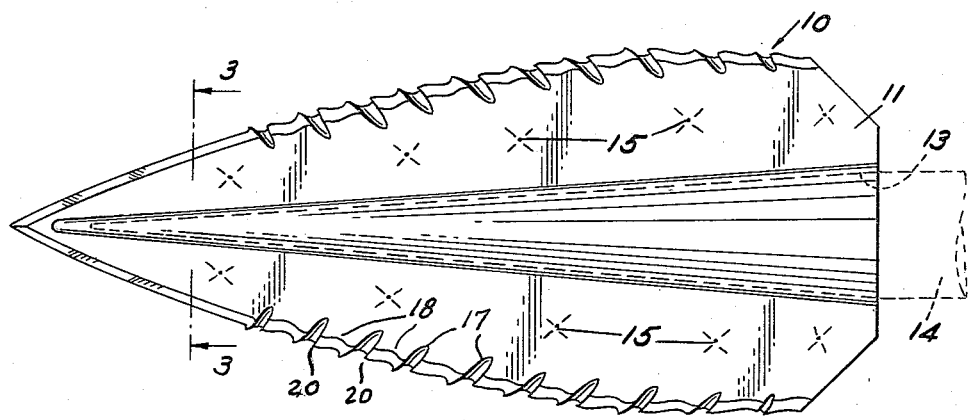
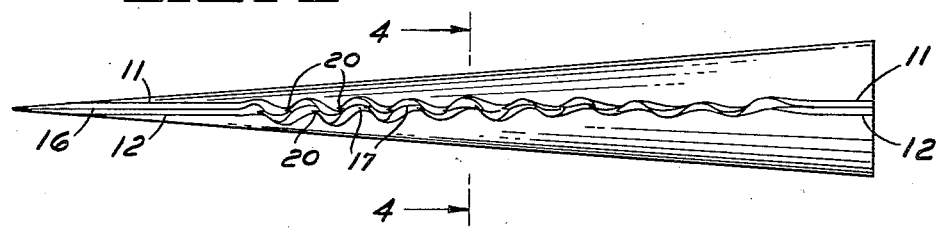
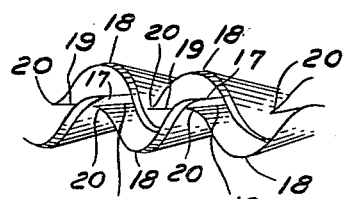
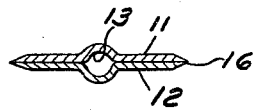
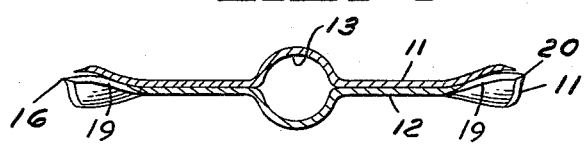
INVENTOR.
WILFORD J. LAFOND
BY
ATTORNEYS

United States Patent Office 2,820,637
Patented Jan. 21, 1958

2,820,637
ARROWHEAD
Wilford J. La Fond, Lapeer, Mich.

Application May 14, 1956, Serial No. 584,580

5 Claims. (Cl. 273—106.5)

This invention relates to an arrowhead and particularly to an arrowhead for use in hunting game animals.

In hunting game animals by use of a bow and arrow, a generally flat arrow point is used. It is desirable that the arrow point be so constructed that it will readily sever both small and large arteries in order to promote better bleeding of the animal and thereby insure a kill or permit the more ready tracking of the animal so that it can be finally killed. In addition, it is desirable that the arrowhead not only cut the arteries and the bone, muscle and other tissue, but in addition, remove and carry with it sections of the bones, tissue and arteries to promote a more heavy bleeding. Finally, it is desirable that the arrowhead be of such a design that it will readily drop out in the event of a non-fatal hit, permitting the wound to heal quickly.

It has recently been suggested that an improved arrowhead may be constructed by milling a series of undercut teeth on the arrowhead. Although such an arrowhead produces some advantages over a plain arrowhead, the construction thereof does not fulfill all of the desired requirements. In addition to being difficult to manufacture, it does not provide a structure which will effectively insure the cutting of small arteries and, in addition, cause portions of bone, muscle and the like to be carried with the arrowhead.

It is therefore an object of this invention to provide an arrowhead which will insure that small arteries will be cut in order to promote better bleeding.

It is a further object of this invention to provide such an arrowhead which will cut through bone, muscle, tissue and the like.

It is a further object of this invention to provide such an arrowhead which will, upon entry into the body of an animal, remove sections of bone, muscle, tissue and the like to cause heavy bleeding.

It is a further object of this invention to provide such an arrowhead which will drop out in the case of a non-fatal hit.

In the drawings:

Fig. 1 is a plan view of the arrowhead embodying the invention.

Fig. 2 is a side elevation of the same.

Fig. 3 is a sectional view taken along the line 3—3 in Fig. 1.

Fig. 4 is a sectional view taken along the line 4—4 in Fig. 2.

Fig. 5 is a perspective view of the edge of the arrowhead, on an enlarged scale.

Referring to the drawings, arrowhead 10 is made from a pair of thin flat plates or members 11, 12, preferably made of sheet metal, each of which is generally triangular in shape and with the central portion bent away from the plane thereof so that when the flat members 11, 12 are brought into contact a socket 13 is formed for the end of shaft 14 of the arrow. Members 11, 12 are secured to each other, for example, by welding, at points 15 spaced from the edge of the arrowhead. The edge of the arrowhead is then bevelled to form a sharp cutting edge, as shown at 16.

Cuts or slits 17 are then formed in member 11 along the edge of the arrowhead by any suitable means such as a cutting tool, die or chisel. The slits are parallel to each other and each forms an acute angle with the axis of the arrowhead and the outer end of each slit extends generally forwardly toward the apex of the arrowhead. A similar row of slits 17 is provided in the member 12. The slits in member 11 are spaced longitudinally from the slits in member 12. In forming the slits in one member the adjacent portion of the metal in the other member is bent out of the plane of the members 11, 12 to provide corrugated portions 18 between the slits. The forward edge 19 of each corrugated portion 18 extends across the plane of the members 11, 12 and provides a sharp point 20. The points 20 extend outwardly of the body of the arrowhead (Fig. 4).

Slits 17 on member 11 are spaced longitudinally of the slits 17 on member 12. In forming each slit, the metal on either side of each slit is bent to form the valley or base of a corrugation. In this manner the slits in the edge of one member lie adjacent the crests or peaks of the corrugations in the other member (Figs. 2 and 5), and the points 20 are in two rows on either side of the general plane of members 11, 12. If, during the forming of slits 17, the metal is bent to a greater extent, the edges of members 11, 12 will be spaced apart, thus further increasing the distance between the two rows of points 20 and, in addition, providing a pair of cutting edges along each edge of the arrowhead (Fig. 5).

By the above construction, each arrowhead includes two rows of sharp points 20 along each edge thereof. When such an arrowhead is used for hunting game animals, the arrowhead penetrates the body of the animal, and upon contact the arteries are cut producing heavy bleeding. The points 20 pick up and draw the small arteries inwardly toward the arrowhead so that they are cut and do not slip by. The corrugated portions 18, together with points 20, remove and carry sections of bone tissue and arteries inwardly, thus further promoting heavy bleeding. When bone is struck by the arrowhead, the edges act in the manner of a saw rather than sliding or skidding off of the bone which would occur if a plain arrowhead were used. In the event that a non-fatal hit is made on the animal, the angularly extending slits permit the arrow to drop from the animal and the wound is such that it may heal quickly.

It can thus be seen that I have provided an arrowhead which may be easily and economically manufactured from thin sheet metal such as stampings and wherein the advantageous construction thereof results from the method of manufacturing from thin sheet metal.

I claim:

1. An arrowhead comprising a pair of generally flat thin members having a generally triangular configuration, said members having the major portions thereof adjacent the edges in fact-to-face contact, said arrowhead being formed with a multiplicity of corrugations along each edge, the corrugations on one edge of one member being complementary to the corrugations on the edge of the other member, the corrugations of each member which fit within the corrugations of the other member being formed with a slit extending generally forwardly of the arrowhead and forming an acute angle with the axis of the arrowhead.

2. The arrowhead set forth in claim 1, the edges of said members being bevelled to form cutting edges.

3. The arrowhead set forth in claim 1 wherein the forward edge of each corrugation adjacent each slit extends across the plane of the major portions of the members and is formed with a sharp point at its outermost end.

4. The arrowhead set forth in claim 3 wherein said outer edges of said members are spaced from each other.

5. An arrowhead comprising a pair of generally flat thin members having a generally triangular configuration, said members having the major portions thereof adjacent the edges in face-to-face contact, said arrowhead being formed with a multiplicity of corrugations along each edge, the corrugations on one edge of one member being complementary to the corrugations on the edge of the other member, the corrugations in one member being spaced from the corrugations in the other member to form a pair of cutting edges along each edge of the arrowhead, the corrugations of each member which fit within the corrugations of the other member being formed with a slit extending generally forwardly of the arrowhead and forming an acute angle with the axis of the arrowhead, the forward edge of each corrugation adjacent each slit extending across the plane of the major portions of the members and being formed with a sharp point at its outermost end, thereby forming two rows of sharp points along each edge of the arrowhead, the row of sharp points on one side of the plane of the major portions of the members being formed by the member on the other side of the plane.

References Cited in the file of this patent

UNITED STATES PATENTS

| | | |
|---|---|---|
| 90,593 | Simonds | May 25, 1869 |
| 1,895,055 | Steinour | Jan. 24, 1933 |
| 2,274,188 | Campbell | Feb. 24, 1942 |
| 2,504,449 | Ramsey | Apr. 18, 1950 |
| 2,589,137 | Ramsey | Mar. 11, 1952 |
| 2,691,527 | Ramsey | Oct. 12, 1954 |